United States Patent
Chang et al.

(10) Patent No.: US 11,259,266 B2
(45) Date of Patent: Feb. 22, 2022

(54) DISTANCE ESTIMATION DEVICE AND METHOD AND SIGNAL-POWER CALIBRATION METHOD

(71) Applicant: Industrial Technology Research Institute, Hsinchu (TW)

(72) Inventors: I-Ping Chang, Tainan (TW); Chia-Shing Huang, Tainan (TW); Hung-Yi Teng, Kaohsiung (TW); I-Hsien Li, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 143 days.

(21) Appl. No.: 16/729,279

(22) Filed: Dec. 27, 2019

(65) Prior Publication Data
US 2021/0176727 A1 Jun. 10, 2021

(30) Foreign Application Priority Data
Dec. 6, 2019 (TW) .................................. 108144639

(51) Int. Cl.
*H04W 64/00* (2009.01)
*H04L 1/00* (2006.01)
(Continued)

(52) U.S. Cl.
CPC ........ *H04W 64/006* (2013.01); *H04B 17/318* (2015.01); *H04L 1/0026* (2013.01);
(Continued)

(58) Field of Classification Search
CPC . H04L 1/0026; H04L 27/2628; H04B 17/309; H04B 17/318; H04W 64/00; H04W 52/242; H04W 64/006; H04W 64/003
(Continued)

(56) References Cited

U.S. PATENT DOCUMENTS 9,686,765 B2  6/2017 Sen et al.
9,706,358 B2  7/2017 Sen et al.
(Continued)

FOREIGN PATENT DOCUMENTS

CN   102340868 B   6/2014
CN   104185270 B   11/2017
(Continued)

OTHER PUBLICATIONS

K. Wu, J. Xiao, Y. Yi, D. Chen, X. Luo and L. M. Ni, "CSI-Based Indoor Localization," in IEEE Transactions on Parallel and Distributed Systems, vol. 24, No. 7, pp. 1300-1309, Jul. 2013, doi: 10.1109/TPDS.2012.214. (Year: 2013).*
(Continued)

*Primary Examiner* — Rownak Islam (57) ABSTRACT

An estimation device is provided. The distance estimation device includes a calibration circuit and a distance estimation circuit. The calibration circuit may receive channel state information (CSI), and obtain signal-path power and noise-path power according to the CSI, and perform calculation to divide the signal-path power by the noise-path power to obtain a signal-power calibration value. The distance estimation circuit is coupled to the calibration circuit. The distance estimation circuit receives a received signal strength indication (RSSI) and the signal-power calibration value, and obtains a path-loss exponent according to the RSSI and the signal-power calibration value, and obtains a distance-estimation value according to the signal-power calibration value and the path-loss exponent.

17 Claims, 7 Drawing Sheets

(51) Int. Cl.
  *H04W 52/24* (2009.01)
  *H04L 27/26* (2006.01)
  *H04B 17/318* (2015.01)
(52) U.S. Cl.
  CPC ....... *H04L 27/2628* (2013.01); *H04W 52/242* (2013.01); *H04W 64/003* (2013.01)
(58) Field of Classification Search
  USPC ........................................................ 370/329
  See application file for complete search history.

(56) References Cited

U.S. PATENT DOCUMENTS

| | | | |
|---|---|---|---|
| 9,841,493 B2 | 12/2017 | Sen et al. | |
| 10,036,806 B2 | 7/2018 | Wijbrans | |
| 2014/0023020 A1* | 1/2014 | Yang | H04L 1/1671 370/329 |
| 2016/0277893 A1 | 9/2016 | Katabi et al. | |
| 2017/0013403 A1 | 1/2017 | Sen | |
| 2017/0082723 A1* | 3/2017 | Pajovic | G01S 5/0294 |

FOREIGN PATENT DOCUMENTS

| | | |
|---|---|---|
| TW | I565960 B | 1/2017 |
| TW | I574026 B | 3/2017 |
| TW | I574029 B | 3/2017 |
| TW | 201842807 A | 12/2018 |
| WO | WO2015191086 A1 | 12/2015 |
| WO | WO2016/138800 A1 | 9/2016 |

OTHER PUBLICATIONS

Bose, Atreyi et al., "A Practical Path Loss Model For Indoor WiFi Positioning Enhancement," IEEE International Conference on Information, Communications & Signal Processing, 2007, 5 pages, IEEE, US.
Sen, Souvik et al., "Avoiding Multipath to Revive Inbuilding WiFi Localization," MobiSys, 2013, 14 pages, ACM, US.
Bardwell, Joe., "Converting Signal Strength Percentage to dBm Values," WildPackets, Nov. 2002, 12 pages, WildPackets, Inc. US.
Vasisht, Deepak et al., "Decimeter-Level Localization with a Single WiFi Access Point," 13th USENIX Symposium on Networked Systems Design and Implementation (NSDI), Mar. 2016, pp. 165-178, USENIX Association, US.
Zhuo, Yiwei et al., "Identifying A New Non-linear CSI Phase Measurement Error with Commodity WiFi Devices," IEEE 22nd International Conference on Parallel and Distributed Systems, 2016, pp. 72-79, IEEE, US.
Xie, Yaxiong et al., "Precise Power Delay Profiling with Commodity WiFi," MobiCom, 2015, 12 pages, US.
Xie, Yaxiong et al., "Precise Power Delay Profiling with Commodity Wi-Fi," IEEE Transactions on Mobile Computing, Jun. 2019, pp. 1342-1355, vol. 18, No. 6, IEEE, US.
Zhu, Hongzi et al., "π-Splicer: Perceiving Accurate CSI Phases with Commodity WiFi Devices," IEEE Transactions on Mobile Computing, Jun. 2017, pp. 1-12, IEEE, US.
Taiwan Patent Office, Office Action, Patent Application Serial No. 108144639, dated Oct. 16, 2020, Taiwan.

* cited by examiner

DISTANCE ESTIMATION DEVICE AND METHOD AND SIGNAL-POWER CALIBRATION METHOD

CROSS REFERENCE TO RELATED APPLICATIONS

This application claims priority of Taiwan Patent Application No. 108144639 filed on Dec. 6, 2019, the entirety of which is incorporated by reference herein.

TECHNICAL FIELD

The disclosure generally relates to distance-estimation technology, and more particularly to distance-estimation technology in which noise-path power which is estimated according to the channel state information (CSI) is used to assist in distance estimation.

BACKGROUND

In the current distance estimation of an orthogonal frequency-division multiplexing (OFDM) system, the received signal strength indication (RSSI) is adopted to perform distance estimation and positioning generally. However, when only the RSSI is adopted for the distance estimation, the result of the distance estimation may be affected by the environment. As a result, a greater distance estimation error may be generated. Therefore, in current distance estimation, channel state information (CSI) is also adopted for the distance estimation to obtain a more accurate distance estimation result than the distance estimation result in which only the RSSI is concerned.

However, when the CSI is used with the RSSI for distance estimation, because the CSI is the physical layer information from the communication module (chip), the CSI may be easily affected by the gain of the automatic gain control (AGC) of the communication module (chip), as a result, the accuracy of the distance estimation result will decrease.

BRIEF SUMMARY

A distance estimation device, a distance estimation method and a signal-power calibration method are provided to overcome the problems described above.

An embodiment in accordance with the disclosure provides a distance estimation device. The distance estimation device comprises a calibration circuit and a distance estimation circuit. The calibration circuit may receive the channel state information (CSI), and obtain signal-path power and noise-path power according to the CSI, and perform calculation to divide the signal-path power by the noise-path power to obtain a signal-power calibration value. The distance estimation circuit is coupled to the calibration circuit. The distance estimation circuit receives a received signal strength indication (RSSI) and the signal-power calibration value, and obtains a path-loss exponent γ according to the RSSI and the signal-power calibration value, and obtains a distance-estimation value according to the signal-power calibration value and the path-loss exponent γ.

In some embodiments, the calibration circuit comprises an inverse fast Fourier Transform (IFFT) circuit, a signal/noise discrimination circuit and a first division circuit. The IFFT circuit receives the CSI. The signal/noise discrimination circuit is coupled to the IFFT circuit. According to the CSI processed by the IFFT circuit, the signal/noise discrimination circuit generates the signal-path power and the noise-path power. The first division circuit is coupled to the signal/noise discrimination circuit. According to the signal-path power and the noise-path power, the first division circuit generates the signal-power calibration value. In some embodiments, the calibration circuit further comprises a first low-pass filter. The first low-pass filter is coupled to the IFFT circuit. The first low-pass filter performs signal processing on the CSI, wherein the CSI processed by the first low-pass filter is sent to the IFFT circuit.

In some embodiments, the distance estimation circuit comprises a second division circuit, a path-loss exponent generator and an estimating circuit. The second division circuit receives the signal-power calibration value and the RSSI, and divides the signal-power calibration value by the RSSI to generate a line-of-sight factor calibration value (Lfactor_C). The path-loss exponent generator is coupled to the second division circuit. The path-loss exponent generator obtains the path-loss exponent according to the line-of-sight factor calibration value. The estimating circuit is coupled to the path-loss exponent generator. The estimating circuit generates the distance-estimation value according to the signal-power calibration value and the path-loss exponent. In some embodiments, the distance estimation circuit further comprises a second low-pass filter. The second low-pass filter is coupled to the second division circuit. The second low-pass filter performs signal processing on the RSSI, wherein the RSSI processed by the second low-pass filter is sent to the second division circuit.

In some embodiments, the distance estimation circuit further comprises a selection circuit. The selection circuit is coupled to the second low-pass filter and the path-loss exponent generator. The selection circuit receives the RSSI processed by the second low-pass filter. According to the RSSI processed by the second low-pass filter, the selection circuit selects an Lfactor_C-to-γ curve from a plurality of Lfactor_C-to-γ curves. In some embodiments, according to the line-of-sight factor calibration value and the selected Lfactor_C-to-γ curve, the path-loss exponent generator obtains the path-loss exponent corresponding to the line-of-sight factor calibration value. In some embodiments, the selection circuit determines whether the RSSI processed by the second low-pass filter is higher than a threshold, wherein when the selection circuit determines that the RSSI processed by the second low-pass filter is higher than the threshold, the selection circuit selects a first Lfactor_C-to-γ curve from a plurality of Lfactor_C-to-γ curves, and when the selection circuit determines that the RSSI processed by the second low-pass filter is not higher than the threshold, the selection circuit selects a second Lfactor_C-to-γ curve from a plurality of Lfactor_C-to-γ curves. In some embodiments, the first Lfactor_C-to-γ curve corresponds to a first distance range, and the second Lfactor_C-to-γ curve corresponds to a second distance range.

An embodiment in accordance with the disclosure provides a distance estimation method. The distance estimation method comprises the steps of receiving channel state information (CSI) and received signal strength indication (RSSI); obtaining signal-path power and noise-path power according to the CSI; performing a calculation to divide the signal-path power by the noise-path power to obtain a signal-power calibration value; obtaining a path-loss exponent according to the RSSI and the signal-power calibration value; and obtaining a distance-estimation value according to the signal-power calibration value and the path-loss exponent.

An embodiment in accordance with the disclosure provides a signal-power calibration method. The signal-power calibration method comprises the steps of receiving channel state information (CSI); obtaining signal-path power and noise-path power according to the CSI; and performing a calculation to divide the signal-path power by the noise-path power to obtain a signal-power calibration value.

Other aspects and features of the disclosure will become apparent to those with ordinary skill in the art upon review of the following descriptions of specific embodiments of the variable gain amplifier and the method for increasing the variable gain.

BRIEF DESCRIPTION OF THE DRAWINGS

The disclosure will become more fully understood by referring to the following detailed description with reference to the accompanying drawings, wherein.

DESCRIPTION OF THE EMBODIMENTS

Figure 1:
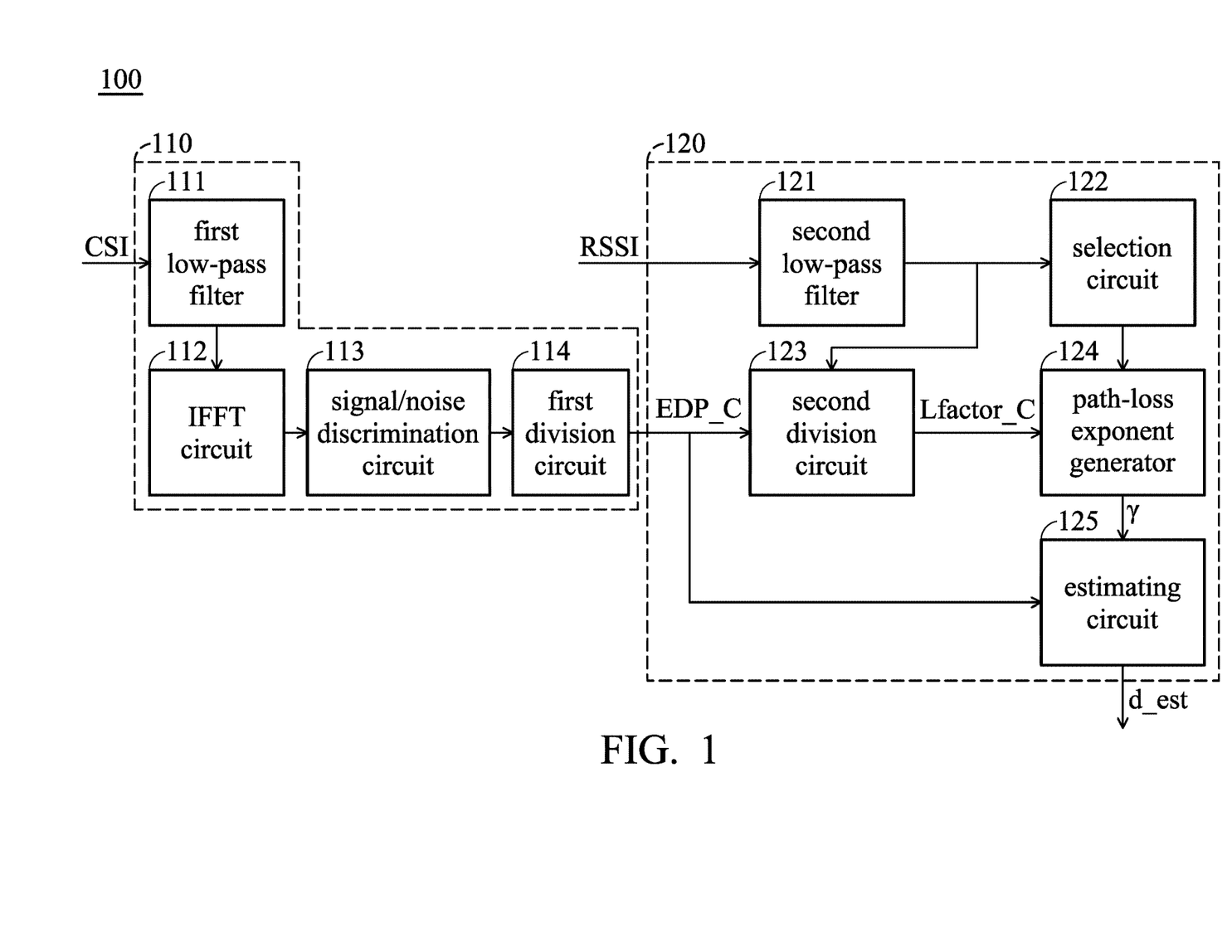
FIG. 1 is a distance estimation device according to an embodiment of the disclosure.

FIG. 1 is a distance estimation device 100 according to an embodiment of the disclosure. As shown in FIG. 1, the distance estimation device 100 may comprise a calibration circuit 110 and a distance estimation circuit 120. The information (e.g. distance-estimation value) generated by the distance estimation device 100 may be transmitted to a positioning module (not shown in figures) to perform the positioning of user equipment (UE). The distance estimation device 100 can be applied to the communication technologies which are based on an orthogonal frequency-division multiplexing (OFDM) technology, e.g. long term evolution (LTE), Wi-Fi, and so on. It should be noted that FIG. 1 presents a simplified block diagram in which only the elements relevant to the disclosure are shown. However, the disclosure is not limited to what is shown in FIG. 1.

In an embodiments of the disclosure, the distance estimation device 100 can be configured in an UE, an access point (AP) or a server. FIGS. 2A-2E are used as examples for illustration.

Figure 2A:
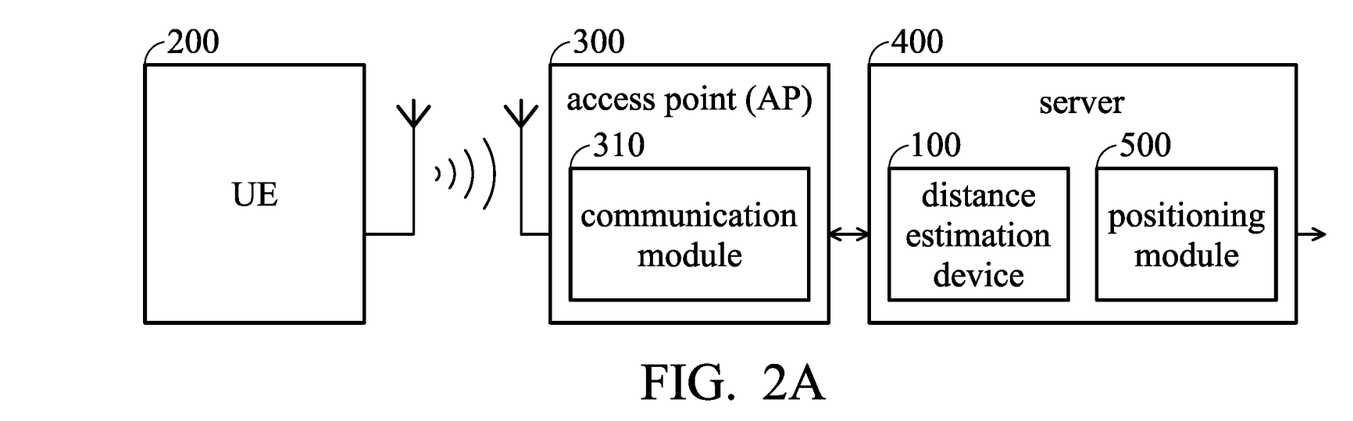
FIG. 2A is a schematic diagram of a configuration of the distance estimation device according to an embodiment of the disclosure.

FIG. 2A is a schematic diagram of a configuration of the distance estimation device 100 according to an embodiment of the disclosure. As shown in FIG. 2A, the distance estimation device 100 is configured in the server 400. In the embodiment, the communication module 310 of the access point (AP) 300 may receive a packet transmitted from the UE 200, and obtain the channel state information (CSI) and received signal strength indication (RSSI) from the packet. Then, the AP 300 may send the CSI and the RSSI to the distance estimation device 100 of the server 400 to perform distance estimation (i.e. estimate the distance between the UE 200 and the AP 300). After the distance estimation device 100 performs the distance estimation, the distance estimation device 100 may send the distance estimation result to the positioning module 500 of the server 400 to perform the positioning for the UE 200. As shown in FIG. 2A, the AP 300 transmits the CSI and the RSSI to the server 400 through a wired communication method, but the disclosure should not be limited thereto. The AP 300 can also transmit the CSI and the RSSI to the server 400 through a wireless communication method.

Figure 2B:
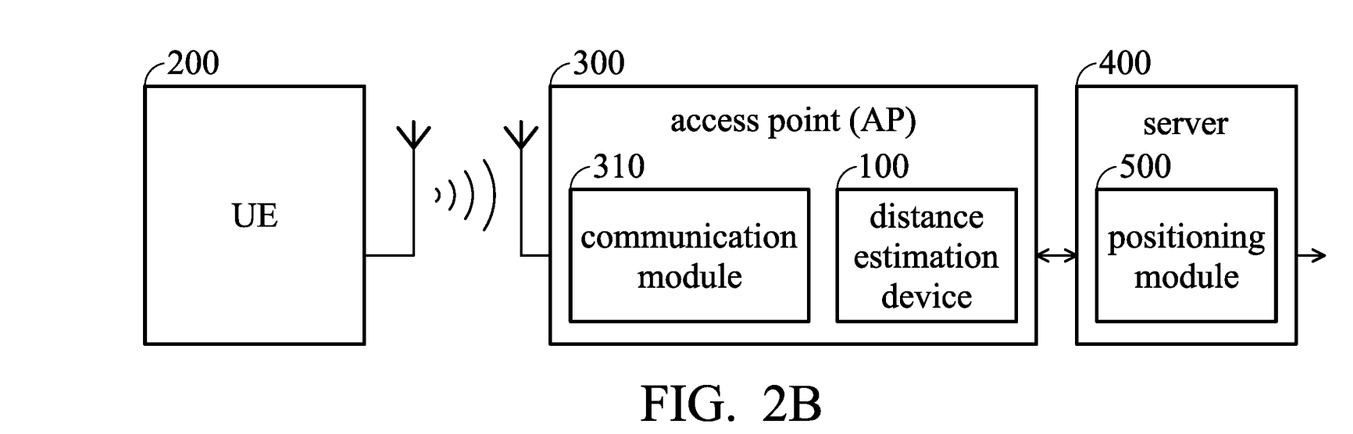
FIG. 2B is a schematic diagram of a configuration of the distance estimation device according to another embodiment of the disclosure.

FIG. 2B is a schematic diagram of a configuration of the distance estimation device 100 according to another embodiment of the disclosure. As shown in FIG. 2B, the distance estimation device 100 is configured in the AP 300. In the embodiment, the communication module 310 of the AP 300 may receive a packet transmitted from the UE 200, obtain the CSI and RSSI from the packet, and transmit the obtained CSI and RSSI to the distance estimation device 100 to perform distance estimation (i.e. estimate the distance between the UE 200 and the AP 300). After the distance estimation device 100 performs the distance estimation, the distance estimation device 100 may send the distance estimation result to the positioning module 500 of the server 400 to perform the positioning for the UE 200. As shown in FIG. 2B, the AP 300 transmits the CSI and the RSSI to the server 400 through a wired communication method, but the disclosure should not be limited thereto. The AP 300 also can transmit the CSI and the RSSI to the server 400 through a wireless communication method.

Figure 2C:
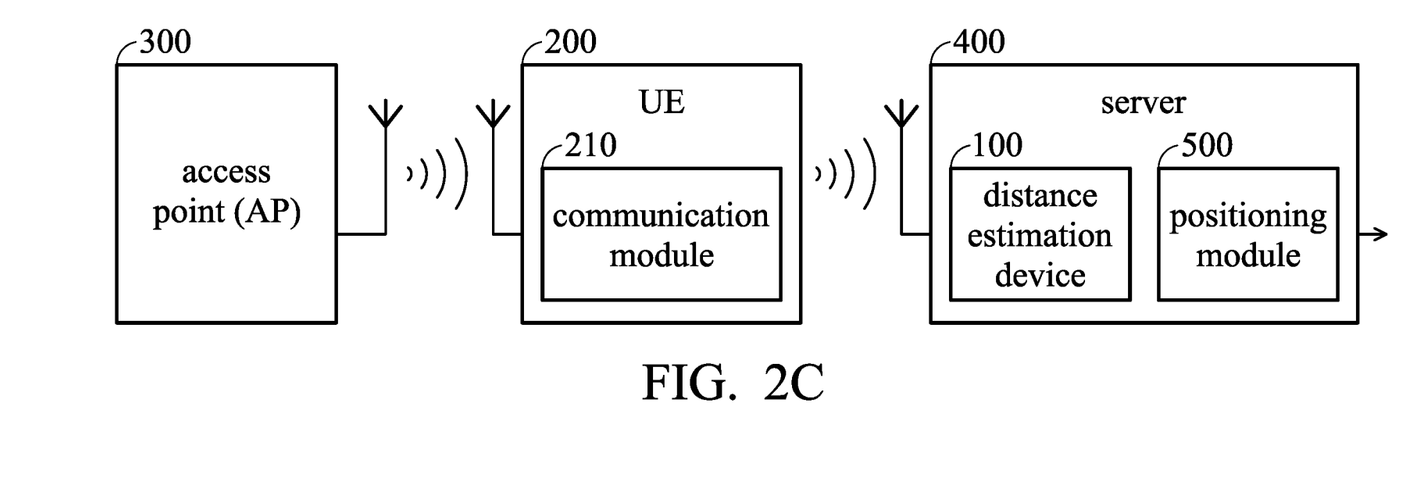
FIG. 2C is a schematic diagram of a configuration of the distance estimation device according to another embodiment of the disclosure.

FIG. 2C is a schematic diagram of a configuration of the distance estimation device 100 according to another embodiment of the disclosure. As shown in FIG. 2C, the distance estimation device 100 is configured in the server 400. In the embodiment, the communication module 210 of UE 200 receives a packet from the AP 300, and obtains CSI and the RSSI from the packet. Then, the UE 200 sends the obtained CSI and RSSI to the distance estimation device 100 of the server 400 to perform distance estimation (i.e. estimate the distance between the UE 200 and the AP 300). After the distance estimation device 100 performs the distance estimation, the distance estimation device 100 may send the distance estimation result to the positioning module 500 of the server 400 to perform the positioning for the UE 200.

Figure 2D:
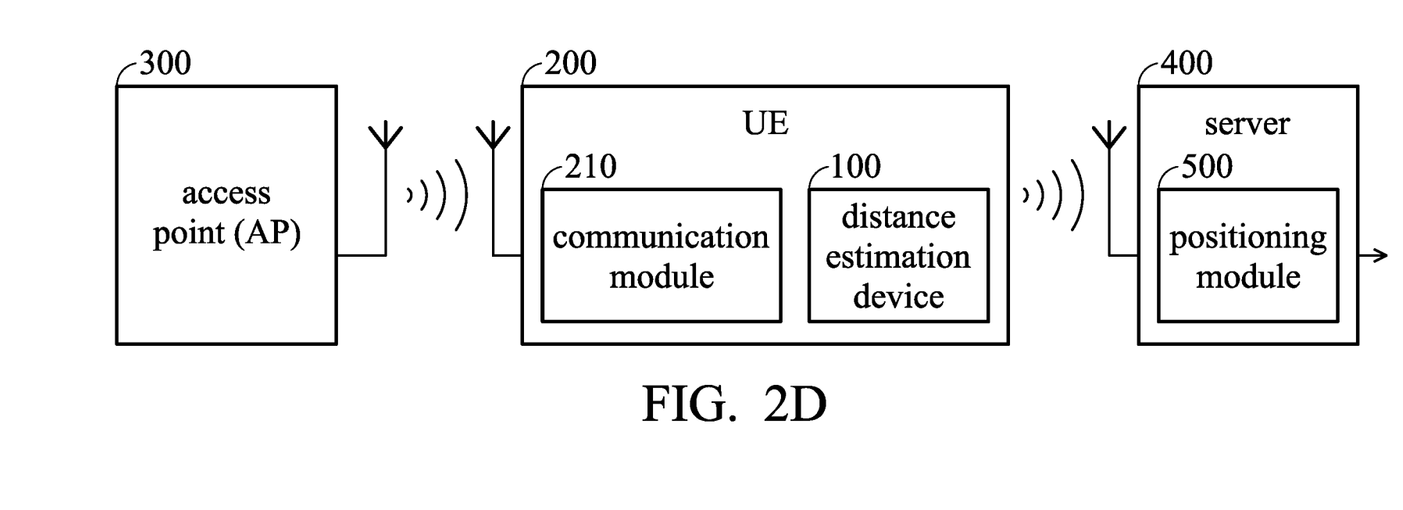
FIG. 2D is a schematic diagram of a configuration of the distance estimation device according to another embodiment of the disclosure.

FIG. 2D is a schematic diagram of a configuration of the distance estimation device 100 according to another embodiment of the disclosure. As shown in FIG. 2D, the distance estimation device 100 is configured in the UE 200. In the embodiment, the communication module 210 of UE 200 receives a packet from the AP 300, and obtains CSI and the RSSI from the packet. Then, the communication module 210 sends the obtained CSI and RSSI to the distance estimation device 100 and the distance estimation device 100 performs distance estimation (i.e. estimate the distance between the UE 200 and the AP 300) according to the CSI and RSSI. After the distance estimation device 100 performs the distance estimation, the distance estimation device 100 may send the distance estimation result to the positioning module 500 of the server 400 to perform the positioning for the UE 200.

Figure 2E:
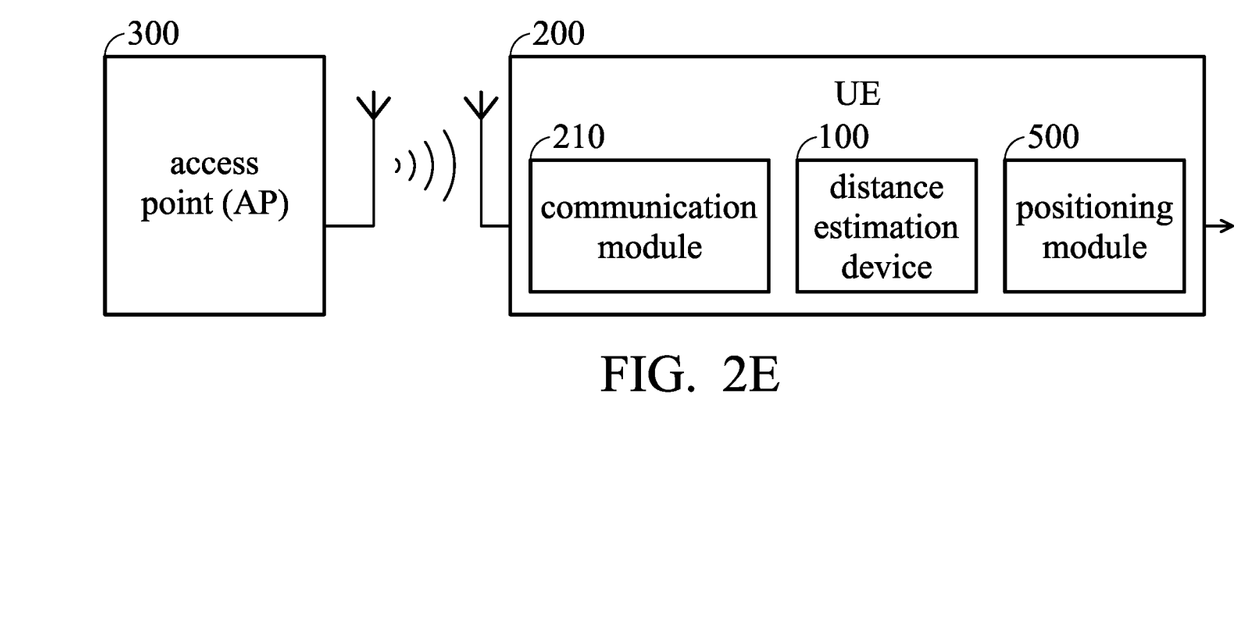
FIG. 2E is a schematic diagram of a configuration of the distance estimation device according to another embodiment of the disclosure.

FIG. 2E is a schematic diagram of a configuration of the distance estimation device 100 according to another embodiment of the disclosure. As shown in FIG. 2E, the distance estimation device 100 is configured in the UE 200. In the embodiment, the communication module 210 of UE 200 receives a packet from the AP 300, and obtains the CSI and the RSSI from the packet. Then, the communication module 210 sends the obtained CSI and RSSI to the distance estimation device 100, and the distance estimation device 100 performs distance estimation (i.e. estimate the distance between the UE 200 and the AP 300) according to the CSI and RSSI. After the distance estimation device 100 performs the distance estimation, the distance estimation device 100 may send the distance estimation result to the positioning module 500 of the UE 200, and the positioning module 500 performs the positioning for the UE 200 according to the distance estimation result.

Back to FIG. 1, as shown in FIG. 1, according to an embodiment of the disclosure, the calibration circuit 110 of the distance estimation device 100 may comprise a first low-pass filter 111, an inverse fast Fourier Transform (IFFT) circuit 112, a signal/noise discrimination circuit 113 and a first division circuit 114.

In the embodiments of the disclosure, after the calibration circuit 110 receives the CSI, the first low-pass filter 111 may perform signal processing for the CSI. Specifically, the first low-pass filter 111 may filter the noise in the CSI to increase the stability of the CSI. According to an embodiment of the disclosure, the first low-pass filter 111 may adopt a moving average method to filter the CSI, but the disclosure should not be limited thereto.

In the embodiments of the disclosure, the first low-pass filter 111 may send the CSI which is processed by the first low-pass filter 111 to the IFFT circuit 112. The IFFT circuit 112 may perform an IFFT operation on the CSI which is processed by the first low-pass filter 111 to generate a power delay profile (PDP). Then, the IFFT circuit 112 may send the PDP to the signal/noise discrimination circuit 113.

In the embodiments of the disclosure, according to the CSI which is processed by the IFFT circuit 112 (i.e. PDP), the signal/noise discrimination circuit 113 may discriminate the signal from the noise in the PDP. According to an embodiment of the invention, the signal/noise discrimination circuit 113 may discriminate the signal from the noise in the PDP according to a default threshold (e.g. a default power value). When the power of a signal of the PDP is greater than the default threshold, the signal/noise discrimination circuit 113 may identify the signal as a signal. When the power of a signal of the PDP is not greater than the default threshold, the signal/noise discrimination circuit 113 may identify the signal as noise. According to another embodiment of the invention, the signal/noise discrimination circuit 113 may discriminate the signal from the noise in the PDP according to a dispersive (expansion) degree. When the dispersive (expansion) degree of the signals of the PDP is greater than a threshold, the signal/noise discrimination circuit 113 may identify the signals as noise, and when the dispersive (expansion) degree of the signals of the PDP is not greater than the threshold, the signal/noise discrimination circuit 113 may identify the signals as the signals. It should be noted that, the above embodiments are only used as examples to illustration, but the disclosure should not be limited thereto. The signal/noise discrimination circuit 113 may adopt other methods to discriminate the signal from the noise in the PDP.

In the embodiments of the disclosure, after the signal/noise discrimination circuit 113 discriminates the signal from the noise in the PDP, the signal/noise discrimination circuit 113 may calculate the path powers corresponding to the signal and noise, wherein the path power of the signal is called as the signal-path power and the path power of the noise is called as the noise-path power below. According to an embodiment of the disclosure, the signal/noise discrimination circuit 113 may send the signal-path power with the maximum power (i.e. it is regarded as the power of the direct path) to the first division circuit 114. According to another embodiment of the disclosure, the signal/noise discrimination circuit 113 may take the first signal-path power of the signal-path powers as the power of the direct path, and send the power of the direct path to the first division circuit 114. According to an embodiment of the disclosure, the signal/noise discrimination circuit 113 may calculate the average value of all noise-path powers, and send the average value of all noise-path powers to the first division circuit 114. The first division circuit 114 may divide the signal-path power (i.e. the power of the direct path) by the noise-path power (i.e. the average value of all noise-path powers) to generate a signal-power calibration value EDP_C. In addition, the first division circuit 114 may send the signal-power calibration value EDP_C to the second division circuit 123 and the estimating circuit 125 of the distance estimation circuit 120. In the signal-power calibration value EDP_C, because the gain generated by the automatic gain control (AGC) of the communication module 210/310 will be eliminated, the calibration circuit 110 of the disclosure can avoid a situation wherein the CSI is affected by the AGC of the communication module 210/310.

Back to FIG. 1, as shown in FIG. 1, according to an embodiment of the disclosure, the distance estimation circuit 120 of the distance estimation device 100 may comprise a second low-pass filter 121, a selection circuit 122, a second division circuit 123, a path-loss exponent generator 124 and an estimating circuit 125.

In the embodiments of the disclosure, after the distance estimation circuit 120 receives the RSSI, the second low-pass filter 121 may perform signal processing for the RSSI first. Specifically, the second low-pass filter 121 may filter the noise in the RSSI to increase the stability of the RSSI. According to an embodiment of the disclosure, the second low-pass filter 121 may adopt a moving average method to filter the RSSI, but the disclosure should not be limited thereto.

In the embodiments of the disclosure, the second low-pass filter 121 may send the RSSI which is processed by the second low-pass filter 121 to the selection circuit 122 and the second division circuit 123.

Figure 3A:
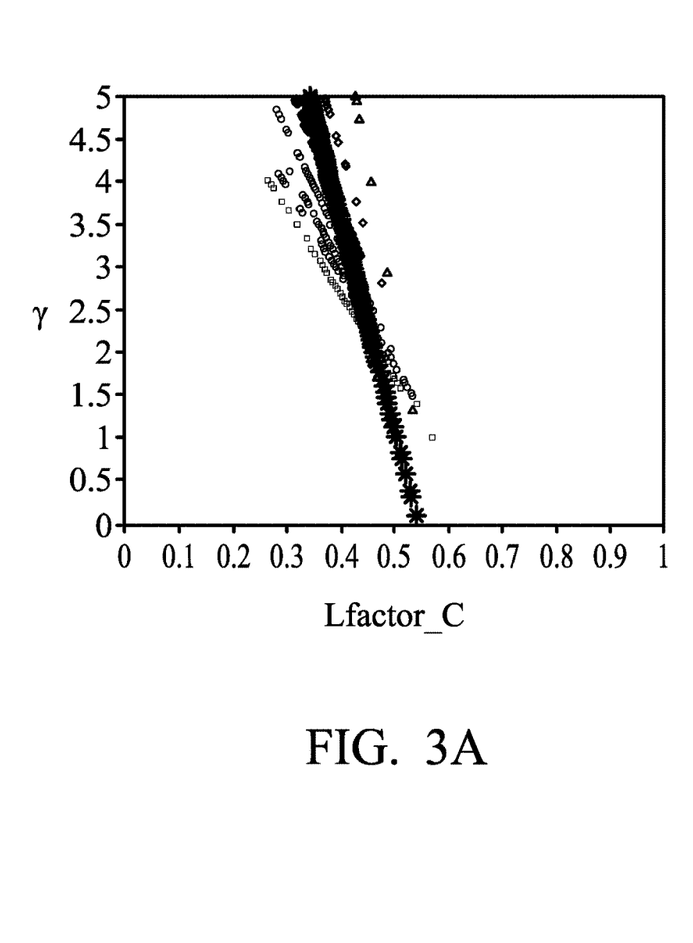
FIGS. 3A-3B is a schematic diagram of Lfactor_C-to-$\gamma$ curves according to another embodiment of the disclosure.
Figure 3B:
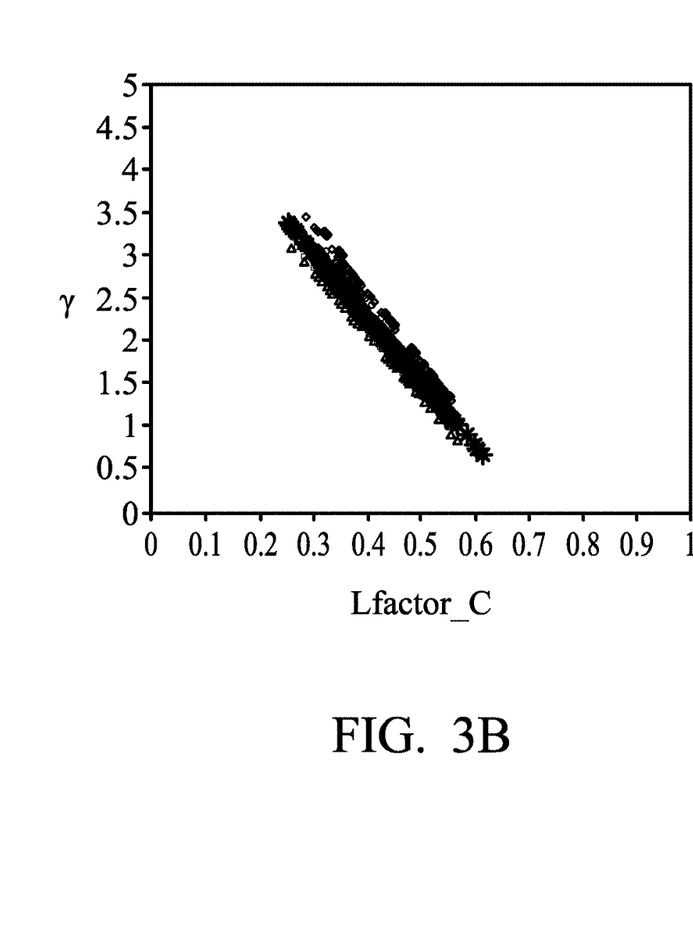

In the embodiments of the disclosure, according to the RSSI which is processed by the second low-pass filter 121, the selection circuit 122 may select a line-of-sight factor calibration value-to-$\gamma$ curve (i.e. Lfactor_C-to-$\gamma$ curve) from a plurality of Lfactor_C-to-$\gamma$ curves. According to an embodiment of the disclosure, a plurality of Lfactor_C-to-$\gamma$ curves may be stored in a storage device (not shown in figures), and each Lfactor_C-to-$\gamma$ curve corresponds to different distance ranges, i.e. each Lfactor_C-to-$\gamma$ curve is applied for different distance ranges. According to the RSSI which is processed by the second low-pass filter 121, the selection circuit 122 may determine the distance range corresponding to the RSSI to select a suitable Lfactor_C-to-$\gamma$ curve from a plurality of Lfactor_C-to-$\gamma$ curves. According to an embodiment of the disclosure, the selection circuit 122 may determine whether the RSSI is higher than a threshold. Taking FIGS. 3A-3B for example, if the selection circuit 122 determines that the RSSI is higher than the threshold, the selection circuit 122 may select a first Lfactor_C-to-$\gamma$ curve (as shown in FIG. 3A) corresponding to a first distance range (e.g. 1-9 meters) from a plurality of Lfactor_C-to-$\gamma$ curves, and if the selection circuit 122 determines that the RSSI is not higher than the threshold, the selection circuit 122 may select a second Lfactor_C-to-γ curve (as shown in FIG. 3B) corresponding to a second distance range (e.g. 10-18 meters) from a plurality of Lfactor_C-to-γ curves. When the value of RSSI is lager, it means that the distance from the device under test is shorter. Therefore, the second distance range is farther than the first distance range. It should be noted that, the above examples are only for illustrating the embodiments of the disclosure, but the disclosure should not be limited thereto. In some embodiments, the selection circuit 122 may refer to more thresholds to set more distance ranges to select the Lfactor_C-to-γ curve. After the selection circuit 122 selects the Lfactor_C-to-γ curve, the selection circuit 122 may send the Lfactor_C-to-γ curve to the path-loss exponent generator 124. In the embodiment of the disclosure, the selection circuit 122 can determine the distance range according to the RSSI first, and then select the suitable parameter model (i.e. Lfactor_C-to-γ curve) according to the distance range. Therefore, comparing to the method in which only one parameter model (i.e. Lfactor_C-to-γ curve) is adopted for different distance ranges, the distance estimation device 100 of the disclosure can increase the accuracy of the distance estimation.

In the embodiments of the disclosure, the second division circuit 123 may divide the signal-power calibration value EDP_C obtained from the first division circuit 114 by the RSSI which is processed by the second low-pass filter 121 to generate a line-of-sight factor calibration value Lfactor_C (i.e. EDP_C/RSSI). Then, the second division circuit 123 may send the line-of-sight factor calibration value Lfactor_C to the path-loss exponent generator 124.

In the embodiments of the disclosure, the path-loss exponent generator 124 obtains a path-loss exponent γ according to the line-of-sight factor calibration value Lfactor_C obtained from the second division circuit 123 and the Lfactor_C-to-γ curve obtained from the selection circuit 122. Specifically, as shown in FIGS. 3A-3B, the horizontal axis of each Lfactor_C-to-γ curve corresponds to the line-of-sight factor calibration value Lfactor_C and the vertical axis of each Lfactor_C-to-γ curve corresponds to the path-loss exponent γ. Therefore, according to the line-of-sight factor calibration value Lfactor_C obtained from the second division circuit 123, the path-loss exponent generator 124 may obtain the path-loss exponent γ corresponding to the line-of-sight factor calibration value Lfactor_C in the Lfactor_C-to-γ curve obtained from the selection circuit 122. The path-loss exponent generator 124 may send the chosen path-loss exponent γ to the estimating circuit 125.

According to the embodiments of the disclosure, the estimating circuit 125 may generate the estimation distance value d_est according to the signal-power calibration value EDP_C and the path-loss exponent γ. According to an embodiment of the disclosure, the estimating circuit 125 may estimate distance according to the following equation:

$$d = 10^{\frac{P_0 - P_r}{10\gamma}},$$

wherein d is the estimation distance value d_est, $P_0$ is a default reference power value, $P_r$ is the signal-power calibration value EDP_C, and γ is the path-loss exponent. After the estimating circuit 125 estimates the estimation distance value d_est, the estimating circuit 125 may transmit the estimation distance value d_est to the positioning module 500 to perform the positioning for the UE.

A supplemental instruction is necessary here, all the function circuits of the distance estimation device 100 also can be realized by software/firmware which can be stored in the memory and performed by one or more single core processors or multi-cores processors.

Figure 4:
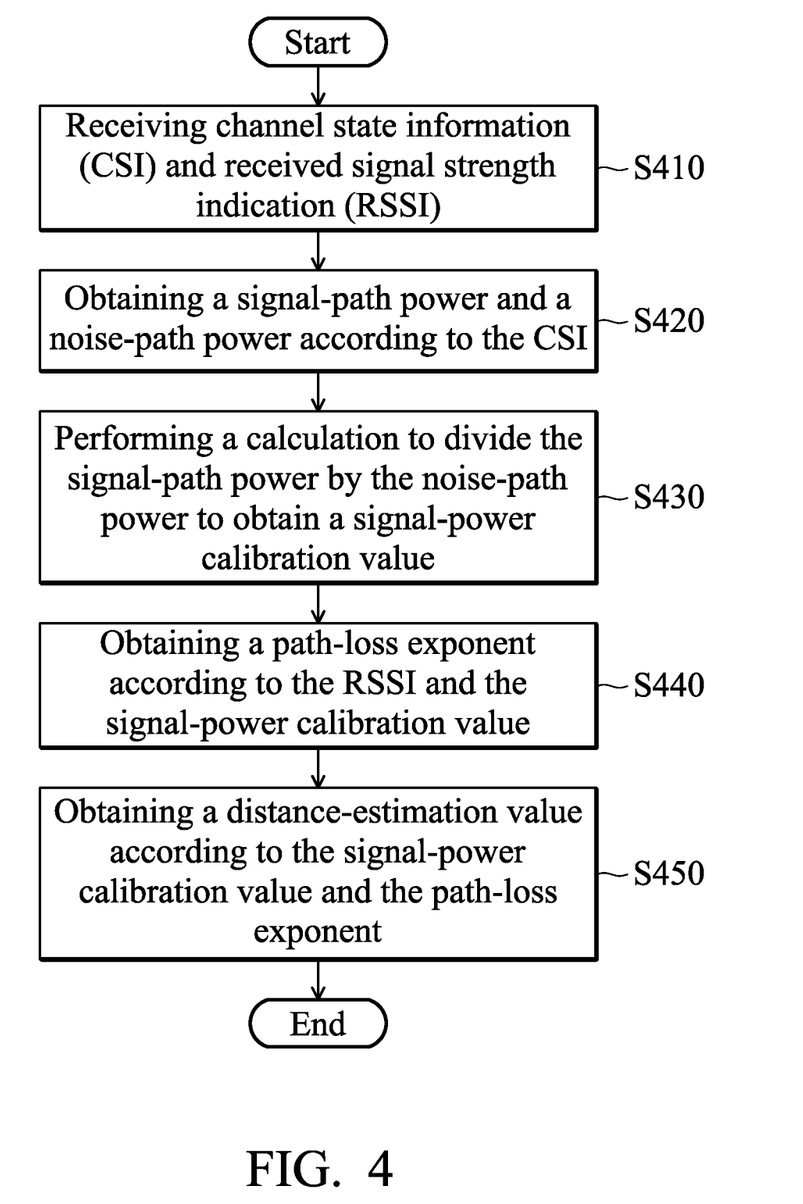
FIG. 4 is a flowchart illustrating a distance estimation method according to an embodiment of the disclosure.

FIG. 4 is a flowchart illustrating a distance estimation method according to an embodiment of the disclosure. The distance estimation method can be applied to the distance estimation device 100. As shown in FIGS. 1 and 4, in step S410, the distance estimation device 100 receives a channel state information (CSI) and a received signal strength indication (RSSI). In step S420, the distance estimation device 100 obtains signal-path power and noise-path power according to the CSI. In step S430, the distance estimation device 100 performs a calculation to divide the signal-path power by the noise-path power to obtain a signal-power calibration value. In step S440, the distance estimation device 100 obtains a path-loss exponent according to the RSSI and the signal-power calibration value. In step S450, the distance estimation device 100 obtains a distance-estimation value according to the signal-power calibration value and the path-loss exponent.

According to an embodiment of the disclosure, step S420 further comprises the following: the distance estimation device 100 may perform an IFFT operation on the CSI, and generates the signal-path power and the noise-path power according to the CSI which is processed by the IFFT operation (i.e. the power delay profile (PDP)).

According to an embodiment of the disclosure, step S420 further comprises the following: before the distance estimation device 100 performs an IFFT operation on the CSI, a first low-pass filter 111 of the distance estimation device 100 may perform signal processing for the CSI.

Specifically, in the step S420, the first low-pass filter 111 may perform signal processing for the CSI to filter the noise in the CSI to increase the stability of the CSI. According to an embodiment of the disclosure, the first low-pass filter 111 may adopt a moving average method to filter the CSI, but the disclosure should not be limited thereto.

In an embodiment of the disclosure, in step S420, the IFFT operation is performed for the CSI which is processed by the first low-pass filter 111 to generate the PDP.

In the embodiment of the disclosure, in step S420, according to the CSI which is processed by the IFFT operation (i.e. PDP), the distance estimation device 100 may discriminate the signal from the noise in the PDP. According to an embodiment of the invention, the distance estimation device 100 may discriminate the signal from the noise in the PDP according to a default threshold (e.g. a default power value). When the power of a signal of the PDP is greater than the default threshold, the distance estimation device 100 may identify the signal as a signal. When the power of a signal of the PDP is not greater than the default threshold, the distance estimation device 100 may identify the signal as noise. According to another embodiment of the invention, the distance estimation device 100 may discriminate the signal from the noise in the PDP according to a dispersive (expansion) degree. When the dispersive (expansion) degree of the signals of the PDP is greater than the threshold, the distance estimation device 100 may identify the signals as noise, and when the dispersive (expansion) degree of the signals of the PDP is not greater than the threshold, the distance estimation device 100 may identify the signals as the signals. It should be noted that, the above embodiments are only used as examples to illustration, but the disclosure should not be limited thereto. Other methods also can be adopted to discriminate the signal from the noise in the PDP.

In an embodiment of the disclosure, in step S420, after the signal is discriminated from the noise in the PDP, the distance estimation device 100 may calculate the path powers corresponding to the signal and noise, wherein the path power of the signal is called as the signal-path power and the path power of the noise is called as the noise-path power below. According to an embodiment of the disclosure, the signal-path power with the maximum power is regarded as the power of the direct path. According to another embodiment of the disclosure, the first signal-path power of the signal-path powers is regarded as the power of the direct path. According to an embodiment of the disclosure, the average value of all noise-path powers is calculated. Then, the signal-path power (i.e. the power of the direct path) is divided by the noise-path power (i.e. the average value of all noise-path powers) to generate a signal-power calibration value. In the signal-power calibration value, because the gain generated by the automatic gain control (AGC) of the communication module 210/310 will be eliminated, the distance estimation method of the disclosure can avoid a situation wherein the CSI is affected by the AGC of the communication module 210/310.

In an embodiment of the disclosure, in step S450, the estimation distance value is generated according to the signal-power calibration value and the chosen path-loss exponent $\gamma$. According to an embodiment of the disclosure, the estimation distance value is estimated according to the following equation:

$$d = 10^{\frac{P_0 - P_r}{10\gamma}},$$

wherein d is the estimation distance value, $P_0$ is a default reference power value, $P_r$ is the signal-power calibration value, and $\gamma$ is the path-loss exponent. After the estimation distance value is estimated, the estimation distance value is used to perform the positioning for the UE.

In an embodiment of the disclosure, step S440 further comprises the following: the distance estimation device 100 divides the signal-power calibration value by the RSSI to generate a line-of-sight factor calibration value (Lfactor_C). Then, the distance estimation device 100 obtains the path-loss exponent according to the line-of-sight factor calibration value and the built-in Lfactor_C-to-$\gamma$ curves.

In an embodiment of the disclosure, step S440 further comprises the following: before the distance estimation device 100 divides the signal-power calibration value by the RSSI, a second low-pass filter 121 of the distance estimation device 100 performs signal processing on the RSSI.

In an embodiment of the disclosure, step S440 further comprises the following: according to the line-of-sight factor calibration value and the selected Lfactor_C-to-$\gamma$ curve, the distance estimation device 100 obtains the path-loss exponent corresponding to the selected Lfactor_C-to-$\gamma$ curve.

In an embodiment of the disclosure, step S440 further comprises the following: the distance estimation device 100 determines whether the RSSI processed by the second low-pass filter 121 is higher than a threshold. When the distance estimation device 100 determines that the RSSI processed by the second low-pass filter 121 is higher than the threshold, the distance estimation device 100 selects a first Lfactor_C-to-$\gamma$ curve from the Lfactor_C-to-$\gamma$ curves; and when the distance estimation device 100 determines that the RSSI processed by the second low-pass filter 121 is not higher than the threshold, the distance estimation device 100 selects a second Lfactor_C-to-$\gamma$ curve from the Lfactor_C-to-$\gamma$ curves. According to an embodiment of the disclosure, the first Lfactor_C-to-$\gamma$ curve corresponds to a first distance range, and the second Lfactor_C-to-$\gamma$ curve corresponds to a second distance range.

Furthermore, in an embodiment of the disclosure, in step S440, after the RSSI is processed by the second low-pass filter 121, the noise of the RSSI can be filtered to increase the stability of the RSSI. According to an embodiment of the disclosure, the second low-pass filter 121 may adopt a moving average method to filter the RSSI, but the disclosure should not be limited thereto.

In an embodiment of the disclosure, step S440 further comprises the following: an Lfactor_C-to-$\gamma$ curve from a plurality of Lfactor_C-to-$\gamma$ curves is selected according to the RSSI which is processed by the second low-pass filter 121, wherein a plurality of Lfactor_C-to-$\gamma$ curves may be stored in a storage device (not shown in figures), and each Lfactor_C-to-$\gamma$ curve corresponds to different distance ranges. That is to say, each Lfactor_C-to-$\gamma$ curve is applied for different distance ranges. In other words, according to the RSSI which is processed by the second low-pass filter 121, the distance range corresponding to the RSSI is determined to select a suitable Lfactor_C-to-$\gamma$ curve from a plurality of Lfactor_C-to-$\gamma$ curves. According to an embodiment of the disclosure, the distance estimation device 100 may determine whether the RSSI is higher than a threshold. Taking FIGS. 3A-3B for example, if the distance estimation device 100 determines that the RSSI is higher than the threshold, a first Lfactor_C-to-$\gamma$ curve (as shown in FIG. 3A) corresponding to a first distance range (e.g. 1-9 meters) is selected from a plurality of Lfactor_C-to-$\gamma$ curves, and if the distance estimation device 100 determines that the RSSI is not higher than the threshold, a second Lfactor_C-to-$\gamma$ curve (as shown in FIG. 3B) corresponding to a second distance range (e.g. 10-18 meters) is selected from a plurality of Lfactor_C-to-$\gamma$ curves. When the value of RSSI is lager, it means that the distance from the device under test is shorter. Therefore, the second distance range is farther than the first distance range. It should be noted that, the above examples are only for illustrating the embodiments of the disclosure, but the disclosure should not be limited thereto. In some embodiments, more thresholds may be referred to set more distance ranges to select the Lfactor_C-to-$\gamma$ curve. In the embodiment of the disclosure, the distance range is determined according to the RSSI first, and then the suitable parameter model (i.e. Lfactor_C-to-$\gamma$ curve) is selected according to the distance range, but it should be noted that the parameter for determining the distance range is not limited to RSSI. Therefore, comparing to the method in which only one parameter model (i.e. Lfactor_C-to-$\gamma$ curve) is adopted for different distance ranges, the distance estimation method of the disclosure may increase the accuracy of the distance estimation.

In an embodiment of the disclosure, step S440 further comprises the following: the signal-power calibration value EDP_C is divided by the RSSI which is processed by the second low-pass filter 121 to generate a line-of-sight factor calibration value (Lfactor_C).

In an embodiment of the disclosure, step S440 further comprises the following: a path-loss exponent $\gamma$ is obtained according to the line-of-sight factor calibration value (Lfactor_C) and the selected Lfactor_C-to-$\gamma$ curve. Specifically, as shown in FIGS. 3A-3B, the horizontal axis of each Lfactor_C-to-γ curve corresponds to the line-of-sight factor calibration value (Lfactor_C) and the vertical axis of each Lfactor_C-to-γ curve corresponds to the path-loss exponent γ. Therefore, according to the line-of-sight factor calibration value (Lfactor_C), the path-loss exponent γ corresponding to the line-of-sight factor calibration value Lfactor_C is obtained from the selected Lfactor_C-to-γ curve.

Figure 5:
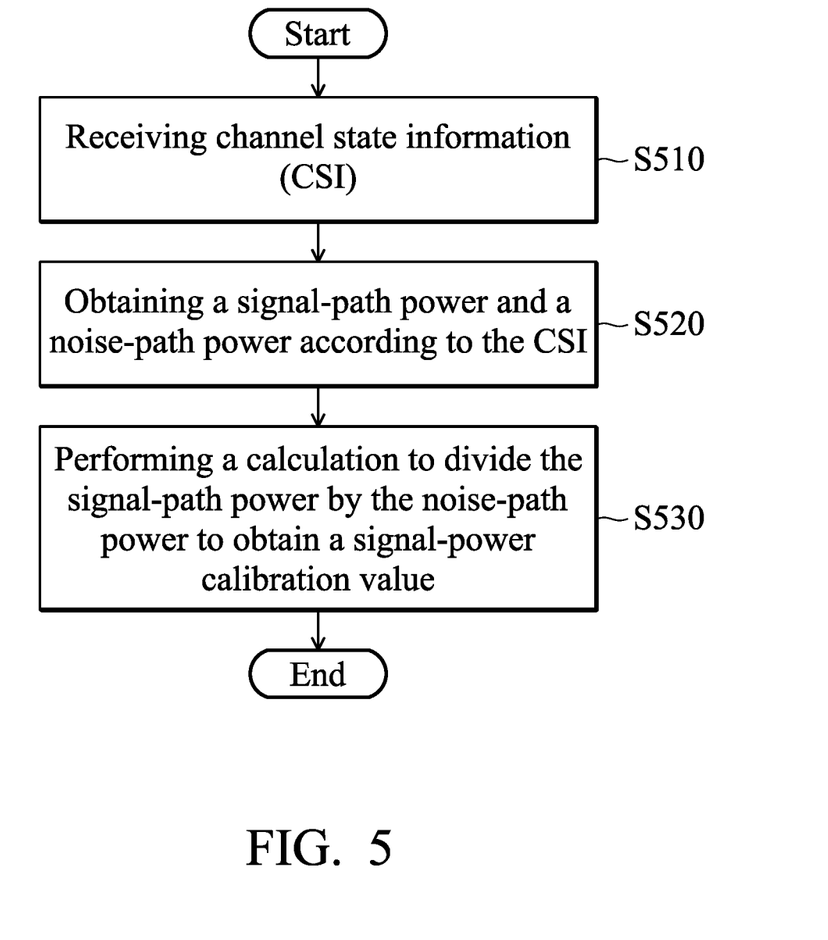
FIG. 5 is a flowchart illustrating a signal-power calibration method for according to an embodiment of the disclosure.

FIG. 5 is a flowchart illustrating a signal-power calibration method for according to an embodiment of the disclosure. The signal-power calibration method can be applied to the calibration circuit 110. As shown in FIGS. 1 and 5, in step S510, the calibration circuit 110 receives a channel state information (CSI). In step S520, the calibration circuit 110 obtains the signal-path power and the noise-path power according to the CSI. In step S530, the calibration circuit 110 obtains a signal-power calibration value according to the signal-path power and the noise-path power. In the signal-power calibration method, in the signal-power calibration value, the gain caused by the automatic gain control (AGC) will be eliminated.

According to an embodiment of the disclosure, step S520 further comprises the following: the calibration circuit 110 may perform an IFFT operation on the CSI, and it generates the signal-path power and the noise-path power according to the CSI which is processed by the IFFT operation (i.e. the power delay profile (PDP)). According to an embodiment of the disclosure, step S530 further comprises the following: the calibration circuit 110 performs a calculation to divide the signal-path power by the noise-path power to obtain a signal-power calibration value.

According to an embodiment of the disclosure, step S520 further comprises the following: before the calibration circuit 110 may perform an IFFT operation on the CSI, a first low-pass filter 111 of the calibration circuit 110 is used to filter the CSI.

Therefore, in the distance estimation method of the embodiments of the disclosure, besides the RSSI and the power of the direct path which is obtained according to the CSI, the noise-path power obtained according to the CSI is also adopted for the distance estimation to avoid a situation wherein the CSI is affected by the AGC of the communication module, as a result the accuracy of the distance estimation decreases. In addition, in the distance estimation method of the embodiments of the disclosure, the low-pass filters are adopted to filter the RSSI and CSI first to increase the stability of the distance estimation. In addition, in the distance estimation method of the embodiments of the disclosure, different Lfactor_C-to-γ curves can be selected according to different distance ranges to increase the accuracy of the distance estimation.

Use of ordinal terms such as "first", "second", "third", etc., in the disclosure and claims is for description. It does not by itself connote any order or relationship.

The method and algorithm disclosed herein may be executed directly by at least one processor which is configured to the call processing device to apply in hardware, in a software module or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor could read information (e.g., code) from the storage medium and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some embodiments any suitable computer-program product may include a computer-readable medium comprising codes relating to one or more of the embodiments of the disclosure. In some embodiments a computer program product may include packaging materials.

The above paragraphs describe many aspects. Accordingly, the teaching of the disclosure may be accomplished by many methods, and any configurations or functions in the disclosed embodiments only present a representative condition. Those who are skilled in this technology will understand that all of the disclosed aspects in the disclosure may be applied independently or be incorporated.

While the disclosure has been described by way of example and as exemplary embodiments only, it should be understood that the disclosure is not configured to limit thereto. Those who are skilled in this technology can still make various alterations and modifications without departing from the scope and spirit of this disclosure. Therefore, the scope of the invention shall be defined and protected by the following claims and their equivalents.

What is claimed is:

1. A distance estimation device, comprising:
   a calibration circuit, receiving channel state information (CSI), and obtaining a signal-path power and a noise-path power according to the CSI, and performing a calculation to divide the signal-path power by the noise-path power to obtain a signal-power calibration value; and
   a distance estimation circuit, coupled to the calibration circuit, and receiving a received signal strength indication (RSSI) and the signal-power calibration value, and obtaining a path-loss exponent according to the RSSI and the signal-power calibration value, and obtaining a distance-estimation value according to the signal-power calibration value and the path-loss exponent;
   wherein the calibration circuit further comprises:
   an inverse fast Fourier Transform (IFFT) circuit, receiving the CSI;
   a signal/noise discrimination circuit, coupled to the IFFT circuit, and generating the signal-path power and the noise-path power according to the CSI processed by the IFFT circuit;
   a first division circuit, coupled to the signal/noise discrimination circuit, and generating the signal-power calibration value according to the signal-path power and the noise-path power; and
   a first low-pass filter, coupled to the IFFT circuit, and performing signal processing on the CSI, wherein the CSI processed by the first low-pass filter is sent to the IFFT circuit.

2. The distance estimation device of claim 1, wherein the distance estimation circuit further comprises:
   a second division circuit, receiving the signal-power calibration value and the RSSI, and dividing the signal-power calibration value by the RSSI to generate a line-of-sight factor calibration value (Lfactor_C);
   a path-loss exponent generator, coupled to the second division circuit, and obtaining the path-loss exponent according to the Lfactor_C; and an estimating circuit, coupled to the path-loss exponent generator, and generating the distance-estimation value according to the signal-power calibration value and the path-loss exponent.

3. The distance estimation device of claim 2, wherein the distance estimation circuit further comprises:
a second low-pass filter, coupled to the second division circuit, and performing signal processing on the RSSI, wherein the RSSI processed by the second low-pass filter is sent to the second division circuit.

4. The distance estimation device of claim 3, wherein the distance estimation circuit further comprises:
a selection circuit, coupled to the second low-pass filter and the path-loss exponent generator, and receiving the RSSI processed by the second low-pass filter, and selecting an Lfactor_C-to-γ curve from a plurality of Lfactor_C-to-γ curves according to the RSSI processed by the second low-pass filter.

5. The distance estimation device of claim 4, wherein according to the Lfactor_C and the selected Lfactor_C-to-γ curve, the path-loss exponent generator obtains the path-loss exponent corresponding to the Lfactor_C.

6. The distance estimation device of claim 4, wherein the selection circuit determines whether the RSSI processed by the second low-pass filter is higher than a threshold, wherein when the selection circuit determines that the RSSI processed by the second low-pass filter is higher than the threshold, the selection circuit selects a first Lfactor_C-to-γ curve from a plurality of Lfactor_C-to-γ curves, and when the selection circuit determines that the RSSI processed by the second low-pass filter is not higher than the threshold, the selection circuit selects a second Lfactor_C-to-γ curve from a plurality of Lfactor_C-to-γ curves.

7. The distance estimation device of claim 6, wherein the first Lfactor_C-to-γ curve corresponds to a first distance range, and the second Lfactor_C-to-γ curve corresponds to a second distance range.

8. The distance estimation device of claim 1, wherein the calibration circuit and the distance estimation circuit are configured in user equipment (UE), an access point, or a server.

9. The distance estimation device of claim 1, wherein the CSI and the RSSI are from a communication module of a UE or a communication module of an access point.

10. A distance estimation method, comprising:
receiving channel state information (CSI) and received signal strength indication (RSSI);
obtaining a signal-path power and a noise-path power according to the CSI;
performing a calculation to divide the signal-path power by the noise-path power to obtain a signal-power calibration value;
obtaining a path-loss exponent according to the RSSI and the signal-power calibration value; and
obtaining a distance-estimation value according to the signal-power calibration value and the path-loss exponent,
wherein the step of obtaining the signal-path power and the noise-path power according to the CSI further comprises:
performing signal processing on the CSI using a first low-pass filter;
performing an inverse fast Fourier Transform (IFFT) operation on the CSI; and
generating the signal-path power and the noise-path power according to the CSI processed by the IFFT operation.

11. The distance estimation method of claim 10, wherein the step of obtaining the path-loss exponent according to the RSSI and the signal-power calibration value further comprises:
dividing the signal-power calibration value by the RSSI to generate a line-of-sight factor calibration value (Lfactor_C); and
obtaining the path-loss exponent according to the Lfactor_C.

12. The distance estimation method of claim 11, wherein the step of obtaining the path-loss exponent according to the RSSI and the signal-power calibration value further comprises:
performing signal processing on the RSSI using a second low-pass filter, before the signal-power calibration value is divided by the RSSI.

13. The distance estimation method of claim 12, wherein the step of obtaining the path-loss exponent according to the RSSI and the signal-power calibration value further comprises:
obtaining the path-loss exponent corresponding to the Lfactor_C according to the Lfactor_C and an Lfactor_C-to-γ curve.

14. The distance estimation method of claim 13, further comprising:
selecting the Lfactor_C-to-γ curve from a plurality of Lfactor_C-to-γ curves according to the RSSI processed by the second low-pass filter.

15. The distance estimation method of claim 14, wherein the step of obtaining the path-loss exponent according to the RSSI and the signal-power calibration value further comprises:
determining whether the RSSI processed by the second low-pass filter is higher than a threshold,
when the selection circuit determines that the RSSI processed by the second low-pass filter is higher than the threshold, selecting a first Lfactor_C-to-γ curve from a plurality of Lfactor_C-to-γ curves; and
when the selection circuit determines that the RSSI processed by the second low-pass filter is not higher than the threshold, selecting a second Lfactor_C-to-γ curve from a plurality of Lfactor_C-to-γ curves.

16. The distance estimation method of claim 15, wherein the first Lfactor_C-to-γ curve corresponds to a first distance range, and the second Lfactor_C-to-γ curve corresponds to a second distance range.

17. A signal-power calibration method, comprising:
receiving channel state information (CSI);
obtaining a signal-path power and a noise-path power according to the CSI; and
performing a calculation to divide the signal-path power by the noise-path power to obtain a signal-power calibration value,
wherein the step of obtaining the signal-path power and the noise-path power according to the CSI further comprises:
performing signal processing on the CSI using a first low-pass filter;
performing an inverse fast Fourier Transform (IFFT) operation on the CSI which is processed by the first low-pass filter; and
generating the signal-path power and the noise-path power according to the CSI processed by the IFFT operation.

* * * * *